Nov. 16, 1965  R. H. VAN HAAGEN  3,217,543
VIBRATED HEAT SENSING PROBE
Filed Jan. 28, 1963
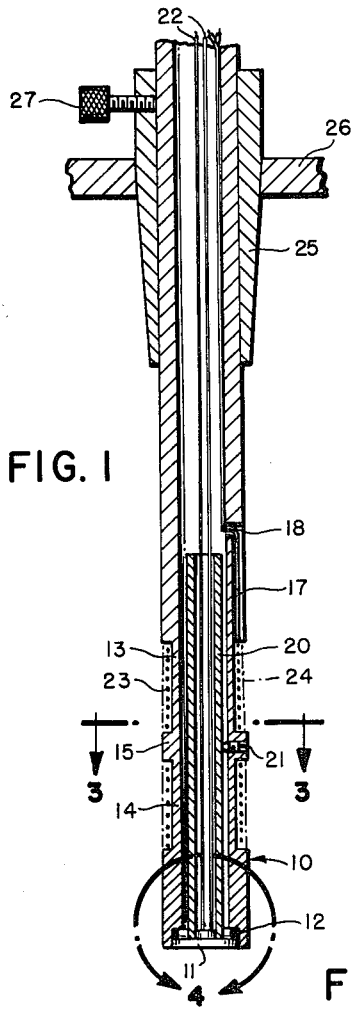
FIG. 1
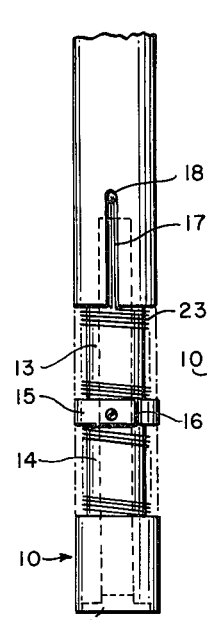
FIG. 2
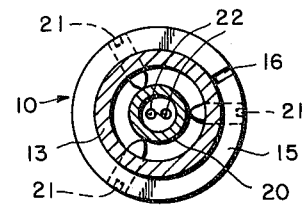
FIG. 3
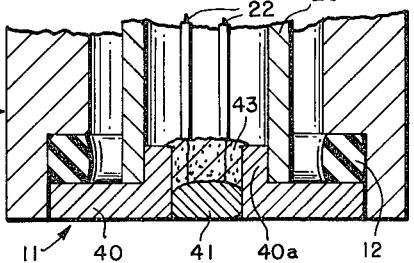
FIG. 4
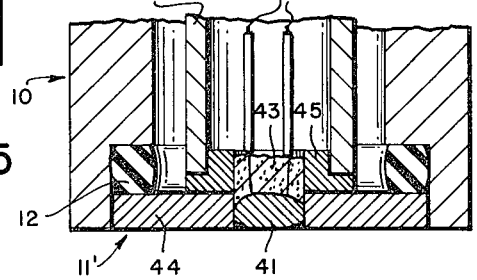
FIG. 5
FIG. 6
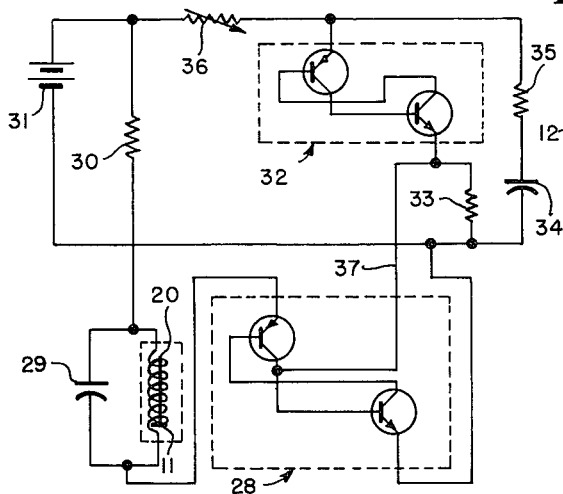
FIG. 7
RICHARD H. VAN HAAGEN
*INVENTOR.*
BY *Seed & Berry*
ATTORNEYS

3,217,543
VIBRATED HEAT SENSING PROBE
Richard H. van Haagen, Kirkland, Wash., assignor to Oceanic Instruments Inc., Houghton, Wash., a corporation of Washington
Filed Jan. 28, 1963, Ser. No. 254,327
4 Claims. (Cl. 73—339)

The present invention relates to an improved sensing probe for use in measuring temperature, intensity of radiation, rate of heat transfer, and the like.

The effective use of such probes, has in the past been greatly limited for many applications as, for example, in the temperature monitoring of powders such as fertilizer and cement, various chemical solutions used in industrial processes, various gas environments, plant effluent, etc., because of fouling by chemical, biological or botanical coatings, collection or growth on the sensor portion of the probe.

Accordingly, the present invention has as its principal object the providing of such a probe of comparatively simple and economical construction which is self-cleaning and can operate without interruption for long periods of time. In carrying out this object the invention provides ultrasonic vibration of the sensor element of the probe, and so a further object is to provide a simple, durable and reliable transducer means and related control for giving such ultrasonic vibration.

Other more particular objects and advantages will, together with the general object appear and be understood in the course of the following description and claims, the invention consisting in the novel construction and in the adaptaton and combination of parts hereinafter described and claimed.

In the accompanying drawings:

FIGURE 1 is a longitudinal vertical sectional view of a probe embodying the invention.

FIG. 2 is an elevational view of the lower half of the probe.

FIG. 3 is a transverse vertical sectional view taken as shown by the line 3—3 of FIG. 1, and drawn to an enlarged scale.

FIGS. 4, 5, and 6 are detail vertical sectional views of the portion 4 indicated in FIG. 1, drawn to an enlarged scale and each showing different embodiments of the sensor portion of the probe; and FIG. 7 is a schematic of the electrical control circuit for the inductance coil of the probe.

Referring to the drawing it is seen that the probe of the present invention has a tubular body 10 which is counterbored at its foot end to provide a seat for a sensor, generally designated 11, and a silicone rubber bushing 12. This bushing is cemented to both the probe body and the sensor to provide a seal therebetween while at the same time permitting the desired oscillation of the sensor relative to the probe body. The latter is fabricated from an electrically non-conductive, non-magnetic and chemically inert material such, for example, as molybdenum disulphide filled nylon and is circumferentially grooved to form a pair of winding spools 13–14 separated by a land 15. This land is notched at 16 to interconnect the spools while the spool 13 connects with the interior of the probe body via a longitudinal groove 17 terminating at a radial port 18.

Longitudinally centered with respect to the land 15 is a magnetostrictive oscillating tube 20 of nickel which rigidly interfits at its lower end with the sensor 11 and is clamped at its longitudinal center by three circumferentially spaced set screws 21 threaded radially through the probe body at the land 15. It will be noted that leads 22 of shielded wire feed through the head of the probe body into the tube 20 and extend therealong to the sensor 11.

Spools 13–14 contain halves of an insulated exciting winding 23 passing therebetween through the notches 16. This winding feeds to and returns from the spool 13 through the head portion of the probe body via the port 18 and the groove 17. There normally will be several wraps on each spool. As indicated by broken lines in the drawing, the turns of winding 23 are protected as by potting 24 or application of a cover sleeve.

A mounting sleeve 25 which is externally tapered may be provided for seating in an opening in the lid 26 of a container for the concerned matter. The depth of the probe can then be readily set by a screw 27 threaded through the sleeve 25.

Directing attention to FIG. 7, the electrical control circuit for the transducer comprises a saw tooth generator 32, an electronic switch 28 triggered by the generator output, and a tank loop controlled by the switch and having the transducer winding 23 as its inductance component. The tank's capacitor and a related resistance are designated 29 and 30. Direct current power for the circuit, shown as being produced by a battery 31, can be derived from any standard rectifier-filter arrangement coupled to an A.C. source. In this regard, the tank and generator can have independent D.C. supplies rather than a common supply as shown.

The saw tooth generator may take the form of a four-layer diode 32 having a resistance 33 at the emitter side and a shunt capacitance 34 and resistance 35. This generator loop has its voltage controlled by a rheostat 36 so that its frequency can be synchronized to the resonant frequency of the tank 23, 29. In operation the four-layer diode 32 provides a discharge path for the capacitance 34. When power is applied to the generator loop capacitor 34 appears as a short circuit, and as current flows through the rheostat 36, provides sufficient bias for current to flow through the diode 32. Capacitor 34 then discharges rapidly through the diode and the bias applied to the latter decreases responsively until it reaches a minimum volume for conduction. The diode then stops conducting until the capacitor recharges. This sequence keeps repeating thereby giving a sawtooth waveform to the output for triggering the switch 28 via a gate control lead 37 from the emitter-base junction of the diode.

As shown schematically, the switch 28 is a single-wafer bistable PNPN device having as its equivalent a complementary pair of PNP and NPN transistors internally constructed so that the base and collector of one are connected respectively to the collector and base of the other. One of these internal connections has the gate lead 37 thereto for causing the turn-on of the switch at the positive peaks of the sawtooth generator output. The voltage build-up across the tank loop responsive to opening of the switch 28 causes the switch to close. However, during this build-up the coil 23 is excited and produces a longitudinal magnetic field around the magnetostrictive tube 20 thereby changing the tube's physical length. In this regard, the tube 20 is given an initial length equal to one-half the wave length of the operating frequency of the metal of which the tube is made. As the current in the coil 23 oscillates with the charging and discharging of the tank's capacitor 29, the resulting oscillation of the magnetic field produced for the tube 20 causes the tube to correspondingly change in length while being centrally clamped by the screws 21. Accordingly, the sensor 11 is vibrated while independently charged through the leads 22. During this vibration the elastic O-ring 12 seals the lower end of the probe body 10.

In order for the end faces of the tube 20 to move responsive to the magnetic field produced by energizing the coil 23, the tube must have a magnetic bias. Such a bias may be produced by installation of a permanent magnet in the probe or by adding a reference winding on the probe body which is offset from the longitudinal center of the tube 20. However, I have found that by the control circuit of FIG. 7 there is sufficient residual magnetism at the time the switch 28 is triggered by the saw tooth generator to maintain the necessary bias for operation.

During each cycle of the tank loop there are of course energy losses in the probe which would dampen the amplitude of the oscillation wave of the magnetic field were it not for supplementation. The latter is controlled by the switch 28, and the triggering cycle thereof must be synchronized with the resonance of the tank loop. This is accomplished by adjusting the rheostat 36 so as to set the period of the saw tooth generator at the tank resonant frequency. In this regard, the components of the tank 23, 29 are selected to give the tank substantially the same resonance as the natural resonance of the magnetostrictive tube 20.

By the described invention the sensor 11 is continuously vibrated in the lower ultrasonic range while in operatio, as for example at about 32 kc., and is thereby kept clean.

In the first embodiment of my invention (FIG. 4) the sensor of the probe takes the form of a thermocouple. It includes a button 40 which is made from a suitable rigid insulating material such as alumina and slidably fits within the counterbore of the body 10. The upper part of this button is stepped providing an outer annular portion bonded to the bushing 12 and a center crown 40a which has a bonded interfit with the lower end of the tube 20.

The two leads 22 of the thermocouple are joined by bead 41 which is housed at the bottom of an axial throughbore 42 in the button 40. Potting 43 holds the bead 41 in position and insulates the adjoining portions of the leads 22. These leads are each formed of standard thermocouple alloys such as alumel and chromel or platinum and rhodium.

In operation, one of these probes is inserted in a reference medium such as ice water, and another in the substance with respect to which a heat measurement is to be taken. A temperature differential between the probes will create an electrical potential the measurement of which can be accomplished, for example, by a bridge circuit. With the tube 20 and sensor 11 vibrating in the aforedescribed manner, the sensor will remain free of deleterious coatings so that proper heat transfer will take place from the measured substance to the thermocouple bead 41.

FIG. 5 shows a second embodiment with the probe again having a thermocouple sensor, but with the sensor, denoted 11′, arranged to present a larger heat transfer surface for slower response. This is accomplished by making a modified button, and namely, a bottom disc 44 bonded as by an epoxy adhesive to a flanged crown 45 of lesser outer diameter. The disc 44 is made of a material of high thermal conductivity such as copper, silver or brass, and the crown 45 is made of a non-conductive material such as alumina. Similarly to the button 40, the outer portion of the modified button is bonded to the bushing 12 and the crown to the tube 20, but differs in that the annular flange 45a of the crown insulates the tube from the disc 44.

If desired, the heat transfer surface 47 of the disc 44 may be made either an absorbing black surface or a reflective white or mirror surface. The black surface is used, for example, when it is desired to measure intensity of radiant heat or rate of heat transfer due to both radiation and conduction, while the reflective surface is used to measure heat transfer by conduction and/or convection irrespective of radiation.

FIG. 6 illustrates a third embodiment where the probe has a thermistor 46 as the sensor measuring element rather than a thermocouple. In this embodiment the sensor, denoted 11″, is illustrated as including the button 40 for purposes of example for fast response, but the FIG. 5 button can be used instead if slower response is desired. The thermistor may be of the platinum resistance type with platinum leads 22′—22′ to a platinum sensing element (coil) covered by ceramic insulation. A waterproof coating as of iconel enamel may be applied for extended use in regions of high humidity. Potting 43′ holds the thermistor bead in position within the bore of the button 40. The resistance of the thermistor element varies according to its temperature, thus providing a means for making the heat measurements. As in the previous embodiments, the vibration of the sensor by the magnetostrictive tube 20 prevents fouling of the heat transfer surface of the sensor.

When the present invention is used in liquids it is found that the vibration of the sensor not only prevents fouling thereof but also gives a pumping action by which the fluid flows toward the center of the sensor button and expels radially outward therefrom. The resulting circulation of the liquid breaks down stratification preventing formation of a stagnant film on the heat transfer surface of the sensor. This assures more sensor, and hence assures more accurate readings.

It is thought that the invention will have been clearly understood from the foregoing detailed description. Changes in the details of construction will suggest themselves and may be resorted to without departing from the spirit of the invention, wherefore it is my intention that no limitations be implied and that the hereto annexed claims be given a scope fully commensurate with the broadest interpretation to which the employed language admits.

What I claim, is:

1. In combination, exposed temperature sensor means, an elongated magnetostrictive tube having one of its ends connected to said sensor means, a shield for said tube, elastic sealing means interconnecting said sensor means and shield, means carried by said shield for clamping said tube intermediate its ends relative to the shield, means for producing a magnetic bias in said tube, means including an inductance winding carried by said shield in surrounding relation to said tube for producing an oscillating longitudinal magnetic field for said tube, and leads extending through said tube and connected to said sensor means.

2. In a probe, exposed sensor means, an electrostrictive member connected to said sensor means, a shield for said member, elastic sealing means interconnecting said sensor means and shield, means carried by said shield for clamping said member to the shield while leaving the member free to expand and contract relative to the shield, means for producing an oscillating electric field for said member, and a lead connected to said sensor means.

3. The probe of claim 2 in which said electrostrictive member comprises a magnetostrictive tube.

4. The probe of claim 2 in which said sensor means comprises a heat sensing button.

References Cited by the Examiner

UNITED STATES PATENTS

| | | | |
|---|---|---|---|
| 2,713,263 | 7/1955 | Turner | 73—290 |
| 2,785,216 | 3/1957 | Winner | 73—359 |
| 2,891,686 | 6/1959 | Roberson et al. | 73—290 |
| 2,990,482 | 6/1961 | Kenny | 73—290 |
| 3,040,579 | 6/1962 | Taylor | 73—359 |
| 3,062,057 | 11/1962 | Glaser et al. | 73—432 |
| 3,129,588 | 4/1964 | Martin | 73—362 |

FOREIGN PATENTS

| | | |
|---|---|---|
| 636,057 | 4/1950 | Great Britain. |

ISAAC LISANN, *Primary Examiner.*